Feb. 26, 1952 A. C. KELLER 2,587,482

PIEZOELECTRIC TYPE SWITCHING RELAY

Filed Sept. 6, 1946

INVENTOR
A. C. KELLER
BY: John E. Cassidy
ATTORNEY

Patented Feb. 26, 1952 2,587,482

UNITED STATES PATENT OFFICE 2,587,482

PIEZOELECTRIC TYPE SWITCHING RELAY

Arthur C. Keller, Bronxville, N. Y., assignor to Bell Telephone Laboratories, Incorporated, New York, N. Y., a corporation of New York Application September 6, 1946, Serial No. 695,317

10 Claims. (Cl. 200—87)

This application relates to electrically operated switches or relays and more particularly to such switches or relays in which the switching elements are actuated by a piezoelectric crystal element in response to an electric potential applied thereto.

An object of this invention is the improvement of piezoelectric crystal relays.

A more particular object of the invention is the improvement of means for amplifying the limited motion obtainable through the distortion of a piezoelectric crystal element in response to changes in potential applied to the crystal element.

As is well known in the art, when an electric potential is applied to a piezoelectric crystal, the crystal undergoes a deformation. The magnitude of the deformation is small and various means have heretofore been employed to increase it. These include the growing of better crystals both by using different materials for the crystal per se and improved methods of production, such as by the use of better temperature controls and systems of agitating the solution out of which the crystal is precipitated, as well as the formation of piezoelectric plates or sections cut in particular directions with respect to the axes of the virgin crystal and finally the amplification of the small distortion by a number of mechanical arrangements, such as by various lever systems.

The present invention in one of its aspects may be considered an improved arrangement for amplifying the motion obtained through the deformation of the crystal in response to the application of electrical potential to the crystal. This improved amplifying arrangement is obtained through a "displacement transformer" by means of which the deformation in the crystal element displaces a quantity of a fluid, such as oil, or semi-fluid material, such as rubber. The area of the fluid or semi-fluid contiguous to the crystal is relatively large. The displacement of the crystal displaces the fluid. The displaced fluid is forced into an opening of relatively small area. The total volumes of the fluid displaced by the crystal and that entering the relatively small opening are equal. Assuming an increase in the vertical dimension of the crystal employed, if the fluid surmounts the crystal, for instance, and the small opening is above the fluid, the height of the column of fluid forced into the opening of small area will be greater than the change in the vertical dimension of the crystal. The amplification in motion thus obtained which is proportional to the relative areas of the surface of the crystal section and the small opening, may be imparted to electrical contacting elements in a variety of ways, or the motion may be translated into changes in the pressure applied to pressure type contacts, which vary in conductivity in response to changes in pressure, to open and close an electrical circuit.

A number of ways of controlling the opening and closing of an electrical circuit by means of a piezoelectric crystal element through a "displacement transformer" are shown in the drawing and described in the following. Other means of practicing the invention than those in which the invention is presently incorporated will readily suggest themselves to those skilled in the art.

Figure 1:
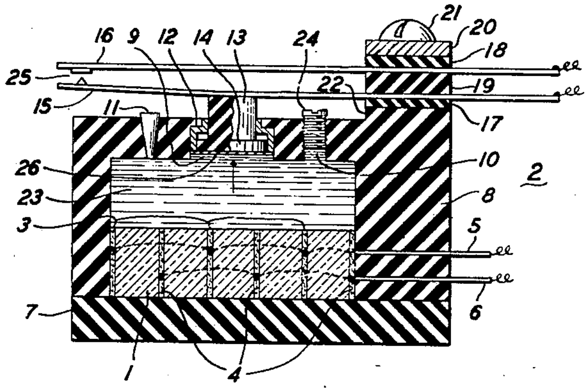
Fig. 1 is a vertical elevation, partly in section, of a crystal element operated switch or relay, including a "displacement transformer"

Refer now to Fig. 1 which shows plates 1 cut from a piezoelectric crystal enclosed within the lower portion of a container 2. The piezoelectric crystal plate 1 may be a plate cut from a crystal of any piezoelectric material, but preferably a plate which responds to the imposition of an electric potential with the greatest volumetric change. It may for instance be a plate cut from a crystal of Rochelle salt, turmaline, quartz, boracite of fluor-spar, but preferably it is a 45-degree Z cut plate from crystalline ammonium dihydrogen phosphate, $NH_4H_2PO_4$, known in the art as an ADP crystal, crystalline potassium dihydrogen phosphate, $KH_2PO_4$, known in the art as a KDP crystal, crystalline ammonium dihydrogen arsenate $NH_4H_2A_sO_4$, or crystalline potassium dihydrogen arsenate $KH_2AsO_4$, as well as plates cut from isomorphous combinations of these four latter substances. A 45-degree Z cut plate is well known in the art. It is a plate cut from a crystal in such manner that the opposing broad surfaces of the plate are both perpendicular to the $z$ axis of the virgin crystal and the linear axis of the plate is at 45 degrees to both the $x$ and $y$ axes of the virgin crystal.

Figure 2:
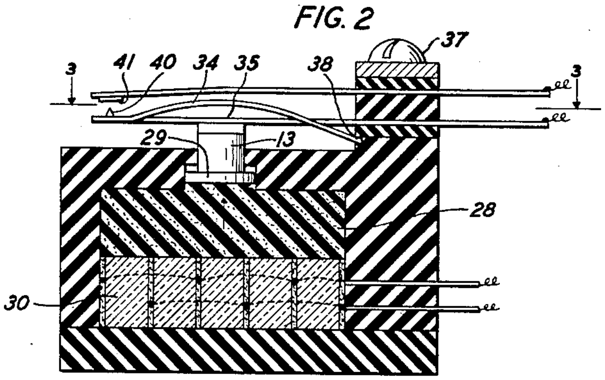
Fig. 2 is a second embodiment featuring a toggle switch arrangement.
Figure 4:
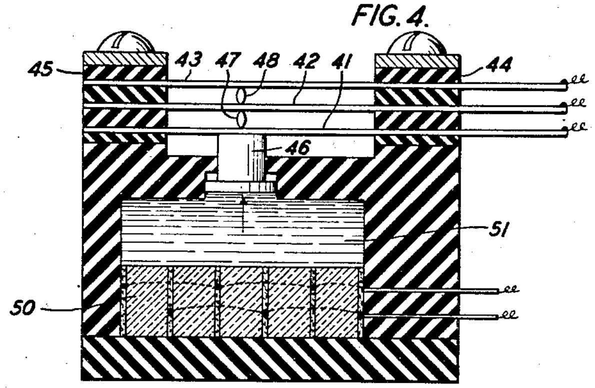
Fig. 4 is a third embodiment featuring pressure type contacts.

The manner in which the electrodes 3 and 4 are applied to the crystal plate will depend upon the kind of crystal which is employed and the direction in which the crystal is cut, so as to obtain the largest possible deformation. When a 45-degree cut crystal is employed the crystal does not move appreciably in the direction of the electrodes. The motor element for 45-degree cut crystal plates preferably consists in a multiple crystal plate unit as shown in Figs. 1, 2 and 4. Electrodes are applied to the external vertical surfaces of the right and left-hand crystal plates and an individual electrode separates the plates and is in electrical contact with the adjoining surface of each crystal to the right and left. The conductors such as 5 and 6 are so connected that positive and negative potential are connected to opposed electrodes between each individual crystal plate forming the crystal motor unit.

The electrodes may, for instance, be of copper coil or of tinfoil. Or, if preferred, the surfaces of the crystal plate may be coated with a conducting material. For this purpose Aquadag, a colloidally fine suspension of carbon, may be used. The external conductor 5, 6 is secured to each of the electrodes 3, 4.

The crystal plate 1, electrodes 3, 4 and conductors 5, 6 are preferably formed into an integral unit. The container 2, which may, for instance, be rectangular as viewed from above, comprises a base 7 and a unitary wall and top portion 8 both of which may be formed, for instance, of insulating material, such as hard rubber, wood, plastic, etc. The top portion is provided with three apertures 9, 10 and 11. Aperture 9 which is of relatively small area is the space into which the fluid displaced by the crystal deformation is forced. Aperture 10 serves as a means of introducing the fluid and aperture 11 is a vent. The aperture 9 has an upper portion of reduced section. The aperture may be provided with a metallic bushing 12 conforming to the shape of the aperture which is fitted snugly into its upper portion. The lower opening in the bushing is closed with a thin flexible metallic diaphragm 26 welded to the bushing and when in position the diaphragm 26 is located a short distance above the lower opening of aperture 9. The bushing 12 and diaphragm 26 form a seal to prevent the escape of fluid. A cylindrical button of insulating material 13, having a base 14 of enlarged section is fitted loosely into the bushing so that the lower surface of the base 14 rests on the upper surface of the diaphragm 26. The insulating button 13 and the bushing 12 are arranged so that motion in a vertical direction may be imparted to the button by movement of the diaphragm.

A pair of contact springs 15 and 16 are secured through individual insulators 17 and 18 and an insulating separator 19 by means of a clamping strip 20 and screws such as 21 to a vertical projection 22 on the upper surface of the top portion 8 of the container 2. The upper surface of button 13 engages the lower surface of contact spring 15. The fluid 23 may be introduced through the aperture 10 and the vent 11 may then be plugged or sealed in any convenient fashion. The aperture 10 may be tapped and provided with a tightly fitting screw plug 24. During the filling operation fluid may be permitted to rise in the lower portion of aperture 10 to a level slightly above the level of the lower surface of the diaphragm. The normal position of the diaphragm is thus possible of limited adjustment and may be controlled by advancing or withdrawing the screw plug to change the level of the liquid under the diaphragm. The tension on the spring 15 and the normal space between the contacts may thus be controlled.

The contact springs 15 and 16 are arranged as shown in Fig. 1 so that they are normally open. It is pointed out that the gap between the contacts will normally be considerably narrower than that shown for purposes of illustration in either Fig. 1 or Fig. 2. Further, it is particularly pointed out that the contacts such as 15 and 16 may normally be closed and may be opened in response to the raising of the button 13 in any of a number of ways such as by perforating the spring 15, for instance, and actuating spring 16 by a vertical pin forming a projection of button 13 and extending through the aperture to engage the bottom surface of spring 16. It is also pointed out that the springs 15 and 16 may be replaced with a pile-up of springs arranged to simultaneously open and/or close individual contacts in any desired manner. The contact arrangements of the pile ups may be makes, breaks, transfers etc., in any desired combination.

In response to an electrical potential impressed between conductors 5 and 6, which extend from the interior to the exterior of the container through individual apertures in the right-hand wall of the container, the crystal 1 undergoes a deformation which increases its volume. The fluid 23 surmounting the crystal 1, is thereby displaced. The fluid 23 is constrained at all points except at aperture 9 wherein the fluid rises, distending the diaphragm 26 upwardly, in turn raising the insulating button 13, actuating contacts 15 and 16 to control an electrical circuit which may be connected thereto.

Figure 3:
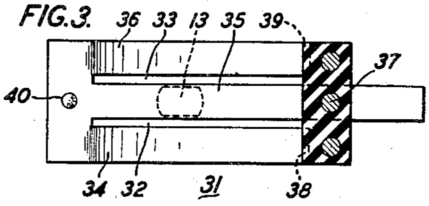
Fig. 3 is a sectional view taken on line 3—3 of Fig. 2 which discloses details of the toggle switch.

Figs. 2 and 3 show an alternative arrangement for that shown in Fig. 1. It differs from that shown in Fig. 1 in that the button 13 operates in combination with toggle type contacts as they are known in the art and instead of a fluid such as oil a semi-fluid 28 such as a flexible rubber, is employed. The flexible rubber in the normal condition surmounts the crystal 30 and fills the entire space within the container not occupied by crystal 30 and projects slightly into the lower portion of aperture 29. The lower surface of the insulating button rests directly on the rubber in aperture 29. When the crystal 30 is deformed in response to the application of potential, pressure is applied to the rubber which flows into aperture 29 raising the button and actuating the switch contacts. The operation of such contacts is well known in the art and is described in Patent 1,960,020 granted to P. K. McGall May 22, 1934, which is incorporated herein by reference as though fully set forth herein. The operation of toggle type switches may be understood from the following.

As shown in Fig. 3 the contacting element 31 is formed of a single thin strip which may be of beryllium copper. Two longitudinal slits 32 and 33 are made in the strip 31 forming three legs 34, 35, and 36. The middle leg is apertured to accommodate a screw 37. The outer legs 34 and 36 are subjected to longitudinal compression from right to left, so that they are both bowed upwardly and their right-hand ends are secured in individual horizontal notches 38 and 39. The upper surface of button 13 bears against the under surface of middle leg 35. When the button 13 is actuated upwardly, after a slight vertical movement of leg 35, the bowed portions of legs 34 and 36 snap downwardly and bow in the reverse direction snapping contact 40 into engagement with contact 41. The upward pressure of the button 13 is maintained against leg 35 which remains in engagement. When the electrical potential is removed from the crystal the reverse operation of the contacts takes place.

In the arrangement in Fig. 4 the crystal motor element 50 is employed in combination with a fluid such as oil and an insulating button to actuate pressure contacts.

Applicant has found that if aluminum, for instance, is anodized that is to say if it is coated in an electrolytic process with a thin self-healing oxidized film it acquires the characteristic that its resistance varies from practically open circuit to zero as the pressure is changed. Anodized aluminum may therefore be employed to control the flow of current through an electrical circuit by changing the pressure applied to the contacts. Pressure type contacts have the advantage that the circuit through the pressure element remains physically closed while the circuit is electrically open. There is no gap between the contacts, no motion of the contacts, no arcing, and therefore no deterioration of contacts due to arcing.

As shown in Fig. 4 three leaf spring conductors 41, 42 and 43 are supported horizontally between two insulator pile-ups and clamping means 44 and 45 so that each spring is individually insulated. The lower spring 41 is normally in engagement with the insulating button 46. The springs are physically interconnected by elements 47 and 48 the resistance of which varies in response to changes in pressure. The elements 47 and 48 may for instance be of anodized aluminum, that is aluminum coated electrolytically by a thin self-healing oxide film. When no pressure is applied to elements 47 and 48 the magnitude of the resistance of the elements 47 and 48 is so great that for all practical purposes the circuit may be considered open. The three springs 41, 42 and 43 are each insulated from each other. In response to the application of pressure, applied through button 46 and fluid 51, when the crystal 50 is deformed as potential is impressed on the crystal, the magnitude of the resistance of pressure elements 47 and 48 drops substantially to zero. Each of springs 41, 42, 43 is electrically connected substantially through zero resistance to each other. It is particularly pointed out that the combination of three spring conductors 41, 42 and 43 and the two pressure elements 47 and 48 are shown for purposes of illustration and that anodized aluminum is only one form of self-healing oxide and that other semi-conductors having similar characteristics may be employed. If only one circuit is to be opened and closed only two springs, such as 41 and 42 and one pressure element such as 47 are required. Many other combinations are possible.

What is claimed is:

1. In an electrical circuit, a piezoelectric crystal element, means for impressing an electric potential on said element to deform said element, a flowable material displaceable in response to said deformation, means for translating said displacement into an amplified displacement of a portion of said material and a displaceable insulator responsive to said amplified displacement for actuating electrical contacting elements.

2. In an electrical circuit, an electric relay comprising a piezoelectric motor element and a fluid both in a container, a constricted means of egress from said container, a displaceable element in said means, engageable electrical contacting elements juxtaposed said displaceable element, means for impressing an electric potential on said motor element to deform said element, said fluid displaceable in response to said deformation into said constricted means of egress so as to amplify the motion due to said deformation, and means, comprising said displaceable element and a contact actuator, said actuator intermediate said displaceable element and said contacting elements, responsive to the forcing of said fluid into said constricted means of egress for actuating said contacting elements.

3. An electric switch comprising a piezoelectric motor element, a source of electrical potential impressible on said element, said element deformable in response to the application of said potential, a fluid, said element communicating its deformation, due to said impressed potential, to said fluid, a surface of said fluid having a relatively large area, said surface communicating with an aperture having a relatively small area, a float in said aperture and electrical contacting elements actuable through said float so as to amplify the motion of said float and of said contacts in response to the deformation of said piezoelectric motor element.

4. An electric relay comprising a container, a piezoelectric motor element in said container, a fluid in said container having a relatively large area juxtaposed said element, an aperture of relatively small area in said container communicating with said fluid, a displaceable element in said aperture, an electrical contact controlled by said displaceable element, and means responsive to the forcing of a portion of said fluid into said aperture, when said fluid is displaced, as said motor element is actuated by an electromotive force, for actuating said contact through said displaceable element.

5. In combination, a piezoelectric motor element, pressure type electrical contacts, a fluid pressure communicating element intermediate said motor element and said contacts, for communicating changes in pressure between said motor element and said contacts, said pressure element responsive to the actuation of said motor element to control the pressure applied to said contacts, so as to control a circuit through said contacts.

6. A piezoelectric motor element, a volumetric type motion transformer, for amplifying motion in a particular direction due to volumetric deformation, said transformer having therein a rubber-like substance to which forces due to volumetric deformation of said element are imparted and a constriction into which a portion of said substance is responsively projected, so as to amplify the motion of said substance in a particular direction, a contact actuator responsive to the amplified motion of said substance in said constriction, and electrical contacts responsive to said actuator.

7. An electrical relay comprising a piezoelectric motor element, a fluid displaceable by said motor element, constriction means for increasing motion of said fluid in a particular direction when said fluid is displaced, and pressure type electrical contacts responsive to the pressure of said fluid applied at the position of said increased motion of said fluid, said contacts normally connected in circuit, the resistance of said contacts changing from substantially that of open circuit value to substantially zero value in response to said changes in pressure.

8. A piezoelectric motor element, a non-liquid semi-fluid displaceable by said motor element, constriction means for increasing motion of said semi-fluid in a particular direction when said semi-fluid is displaced, and electrical contacts responsive to said increased motion of said semi-fluid.

9. A volumetric transformer comprising a container, a piezoelectric motor element in said container, a source of electromotive force impressible on said element to deform said element, a material in said container deformable in response to the deformation of said element, a constriction in said container, a portion of said material projectable into said constriction in response to the deformation of said element so as to amplify motion of said material in a particular direction, and electrical contacts responsive to said projection.

10. In combination, a piezoelectric motor element, electrical contacts, a readily deformable, force-communicating material intermediate said motor element and said contacts, for communicating force between said motor element and said contacts, responsive to the deformation of said motor element.

ARTHUR C. KELLER.

REFERENCES CITED

The following references are of record in the file of this patent:

UNITED STATES PATENTS

| Number | Name | Date |
|---|---|---|
| 1,774,337 | Sichel | Aug. 26, 1930 |
| 2,033,631 | Greutzmacher | Mar. 10, 1936 |
| 2,283,285 | Pohlman | May 19, 1942 |
| 2,405,226 | Mason | Aug. 6, 1946 |
| 2,423,306 | Forbes et al. | July 1, 1947 |

FOREIGN PATENTS

| Number | Country | Date |
|---|---|---|
| 93,756 | Austria | Mar. 15, 1923 |